June 27, 1961 H. G. ARNOLD 2,990,033
DRIP TRAY OR THE LIKE
Filed Sept. 18, 1959

*INVENTOR.*
HAROLD G. ARNOLD
BY
Oldham & Oldham
ATTYS.

United States Patent Office 2,990,033
Patented June 27, 1961

2,990,033
DRIP TRAY OR THE LIKE
Harold G. Arnold, 1201 Forest Drive, Wooster, Ohio
Filed Sept. 18, 1959, Ser. No. 840,890
3 Claims. (Cl. 184—106)

This invention relates to drip trays, for example, of the type adapted to be used underneath motor vehicles to catch oil drippings, and, more particularly, the invention is concerned with an improved manner of securing the drip tray to a hard surface, such as a garage floor, so that it will not skid or be knocked out of proper position.

Drip trays have been provided heretofore for catching oil drippings beneath motor vehicles, but these have been open to the objection that they are relatively expensive, and are difficult or obnoxious to clean, so that they are often used without cleaning long after they should have been cleaned or thrown away. Additionally, known trays have tended to skid or become displaced from the proper position underneath the motor vehicle so that they are run over by the tires of the vehicle and broken, or are not properly positioned to catch the drippings.

It is the general object of the present invention to avoid and overcome the foregoing and other difficulties of and objections to prior art practices by the provision of an improved relatively inexpensive drip tray for use underneath motor vehicles, and the like, and characterized by light weight, low cost, and stability of positioning, with the tray being thrown away when it becomes objectionably soiled.

Another object of the invention is to provide a drip tray of the type described wherein relatively soft and stickly clay-like material is used to secure the tray in position on the garage floor, or the like, the material being readily formable to adapt itself to every shape and contour of the floor to effectively hold the tray in position in much better fashion than rubber suction cups, gravity, true adhesives, or other known means.

Another object of the invention is the provision of a tray of the character set forth which is characterized by being constructed from relatively lightweight, inexpensive, flexible sheet material which can be a premium or give-away item for a gasoline service station, which can be rolled up to form a relatively compact package, and which can be discarded when soiled.

The foregoing objects of the invention, and other objects which will become apparent as the description proceeds, are achieved by the provision of a drip tray having a substantially flat body of relatively flexible sheet material, an integral flange around substantially the periphery of the body, and at least one member and usually a plurality of members of relatively soft and sticky clay-like material secured underneath the body, and a readily removable film covering the exposed surface of the member or members during handling and shipment, but with the film being removable before the tray is applied to a garage floor.

In the drawings, FIG. 1 is a plan view, partially broken away, of one embodiment of a tray incorporating the principles of the invention;

Figure 1:
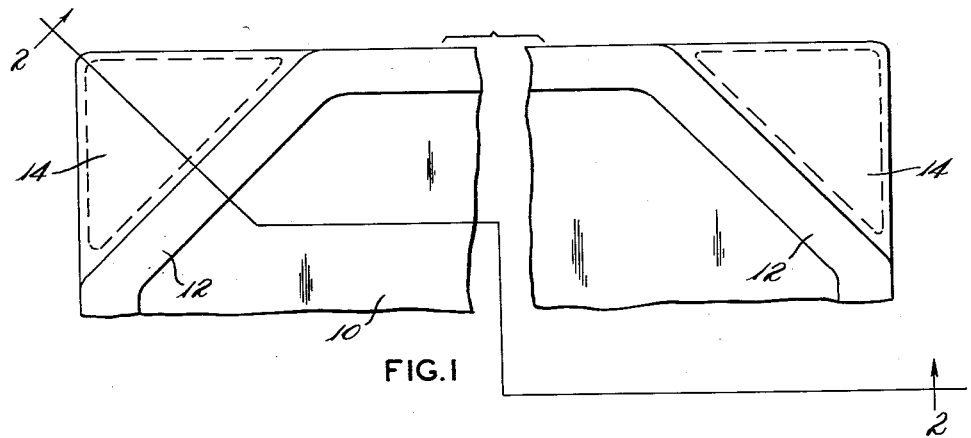
Figure 2:
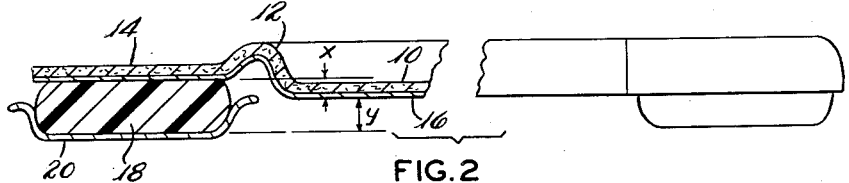
FIG. 2 is a view, partially in cross section and partially in elevation, and taken on line 2—2 of FIG. 1.

Having reference to FIGS. 1 and 2, the numeral 10 indicates generally a substantially flat rectangularly shaped body portion, for example, molded from papier-mache and being sheet-like and relatively flexible. The body portion 10 is formed with an integral rib or flange 12 around substantially its outer periphery, and in the form of the invention illustrated the flange 12 is of inverted U-shape. The rib or flange 12 cuts across the corners of the body 10, in the manner best seen in FIG. 1, to leave substantially triangular ears 14 extending out from the corners of the body, the ears 14 being relatively flat and positioned in a plane offset upwardly from the body portion 10 by a distance marked X and shown in FIG. 2.

Preferably the underside of the body portion 10, ribs 12, and ears 14 are covered by a coating 16 of moisture-proof lacquer, which can be sprayed or otherwise applied thereto to assist in rendering the tray moisture-proof.

Positioned underneath each corner or ear 14 of the tray is a body of clay-like material 18 having a thickness at least several times the thickness of the sheet forming the body portion of the tray, and with the material 18 extending a distance Y beneath the undersurface of the body portion 10. The clay-like material 18 can be clay, i.e., a plastic, soft, variously colored earth, formed by the decomposition of feldspar and other aluminum minerals, usually a hydrous silicate of alumina ($H_4Al_2Si_2O_9$) wherein 30% of the total weight of solid particles consists of particles of diameter less than 0.002 mm. The material is typically a potter's clay which can be described as a pure plastic clay, free from iron. The characteristic of the material which seems to make it perform so satisfactorily as a support and securing means for the tray is an inertness or lack of resiliency so that when the material 18 is pressed down against a garage floor or the like which has been swept, but which is not completely free of dirt, the clay-like material 18 will conform itself to the complete shape and configuration of the supporting floor, filling every minute crack or indentation and having an inherent and continuing plastic stickiness which seems to absorb any gritty particles or film of surface dirt on the surface. The result is a particularly excellent but not a truly adhesive fastening of the tray to the floor of the garage. It has been found that the tray can be physically pulled loose from the floor and repositioned thereon a number of times, and although this is not done in actual use of the tray, it emphasizes the particularly excellent fastening action of the clay-like material 18 with respect to the floor.

The bottom or exposed surface of the clay-like material 18 is normally covered with an impervious film, for example a waxed paper, and indicated by the numeral 20 during shipment and handling, this film 20 being peeled off of the material 18 before the tray is adhered to the garage floor.

In the use of the tray described it will be understood that when the tray is to be positioned upon the garage floor that the film 20 is stripped from the clay-like material 18, the tray is positioned on the floor in proper relationship to the motor vehicle, and usually with the motor vehicle out of the garage, and after the floor has been at least partially cleaned to remove any crust of oil or dirt. Then the corners of the tray immediately above the material 18 are pressed downwardly by the hand or foot to press the material 18 into close conformity with the floor, and to noticeably reduce the vertical height of the material 18, and to bring the center portion of the tray substantially into engagement with the surface of the floor. Thereafter, any oil or other liquid dripping from the motor vehicle is caught in the tray 10, and is held in position thereon by the rib or flange 12. The papier-mache of the body of the tray acts with a blotter-like absorbing action, and is capable of absorbing a considerable quantity of liquid. The moisture-proof coating 16 on the underside of the tray increases the life of the tray.

Figure 3:
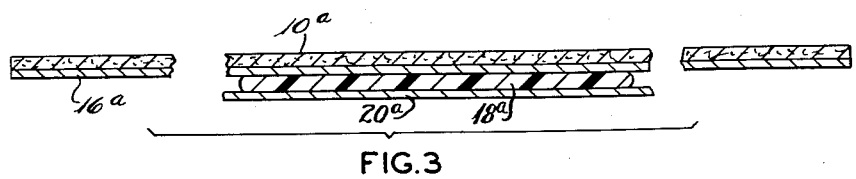
FIG. 3 is a cross sectional view, partially broken away, of another form of tray incorporating the features of the invention.

In the form of the invention illustrated in FIG. 3, the tray body 10a may be made of a sheet of flexible material of blotting paper consistency, and is indicated by the numeral 10a. This sheet of material is provided with a coating 16a underneath it of moisture proofing characteristics. Positioned centrally of the sheet 10a is a somewhat larger, but flatter wafer-like body 18a of the clay-like material, this body being removably covered with an impervious film 20a.

In this form of the invention, which is still less expensive than the relatively simple form of FIGS. 1 and 2, the complete assembly illustrated can be packaged and shipped flat, a plurality of dozen of the trays being in a single cardboard carton, as the trays are removed one by one from the carton, to be handed to an individual customer, the trays can be rolled into a cylinder, like a calendar, for transportation by the customer to his own garage. Once at the garage, the tray will be unrolled and then rolled up in the opposite direction to flatten it, the film 20a will be peeled off of the material 18a, and the tray will be positioned underneath the motor vehicle. Pressure will then be applied to the top of the tray over the material 18a to press it firmly into engagement with the floor, and at least certain of the advantages of the invention will be achieved.

Figure 4:
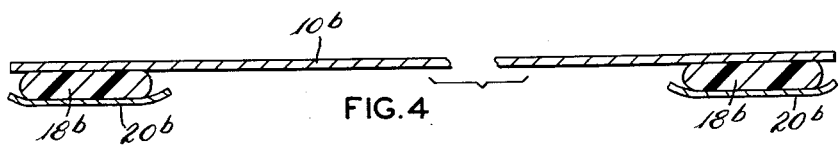
FIG. 4 is a view similar to FIG. 3 but of still another embodiment of the invention.

In the embodiment of the invention shown in FIG. 4, a sheet of flexible metal foil 10b is provided along its edges with strips, or at its corners with buttons of relatively soft and sticky clay-like material 18b, whose undersurfaces are protected during handling and shipping with an impervious film 20b.

This form of the invention, like that of FIG. 3, can be shipped flat in quantities of a plurality of dozen in a cardboard carton, can be removed one by one from the carton and rolled into a cylinder or offered flat for handling by a customer, and with the tray being applied to a garage floor in the same manner already described.

Any of the several forms of the invention illustrated and described have the advantage that they are relatively inexpensive, and once soiled can be thrown away and thereafter replaced with a new tray. Once the trays are positioned in the manner described in proper relation to the motor vehicle they have been found to retain this position over a long period of time even if accidentally kicked, struck by the motor vehicle tires, and the like.

Figures 5, 6:
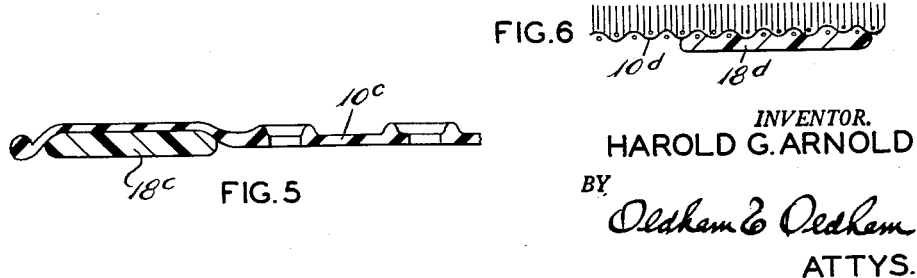
FIGS. 5 and 6 are fragmentary cross sectional views of other forms of the invention.

It will also be recognized that even though the invention has been specifically described as a drip tray for automobiles that it has a variety of other uses. For example, the invention, and specifically the clay fastening feature thereof, can be used with a desk pad, a rug, a bathtub mat, or the like to hold it in position. FIG. 5 illustrates how a rubber bathtub mat 10c appropriately corrugated in any desired fashion can employ a body of relatively soft and sticky clay-like material 18c to secure the bath mat to the tub, shower surface or bathroom floor. If the mat is secured to the tub or shower when dry the mat continues to stay in position even when the tub or shower becomes wet.

FIG. 6 shows how a throw or other rug 10d may be provided with a body of soft and sticky clay-like material 18d for securing the rug to the floor.

Of course, the clay-like material can be used to secure a body to other than a hard surface. For example, it can be used to secure a doily to the arm of a chair, to secure a chair pad to a chair seat, and the like.

While in accord with the patent statutes at least certain embodiments of the invention have been illustrated and described in detail, it is to be particularly unduerstood that the invention is not limited thereto or thereby, but that its scope is defined in the appended claims.

What is claimed is:

1. An oil drip tray for placement under motor vehicles or the like and including a molded papier-mache body having a relatively flat center portion, an integral raised rib surrounding the periphery of the body center portion, said rib cutting across the corners of the body to leave substantially triangular flatly extending ears at the corners of the body, the plane defined by the bottom of the ears being offset upwardly from the plane defined by the bottom of the body center portion, a coating of liquid proofing material over the bottom of the body center portion, the rib and the ears, bodies of relatively soft and sticky potter's clay on the underside of the ears and extending below the plane defined by the bottom of the body center portion, and a sheet of wax paper over the underside of each body of potter's clay, the bodies of clay extending below the bottom of the body center portion by an amount which is displaceable upon the pressing of the tray against a surface to thereby bring the body center portion into engagement with the surface.

2. An oil drip tray for placement under motor vehicles or the like and including a sheet-like body having a relatively flat center portion, an integral raised rib surrounding the periphery of the body, flatly extending ears at the corners of the body outside the rib, the plane defined by the bottom of the ears being offset upwardly from the plane defined by the bottom of the body center portion, a coating of liquid proofing material over the bottom of the body center portion, the rib and the ears, bodies of relatively soft and sticky potter's clay on the underside of the ears and extending below the plane defined by the bottom of the body center portion, and a sheet of wax paper over the underside of each body of potter's clay.

3. An oil drip tray for placement under motor vehicles or the like and including a sheet-like body having a relatively flat center portion, an integral raised rib surrounding the periphery of the body, flatly extending ears at the corners of the body, a coating of liquid proofing material over the bottom of the body portion, bodies of relatively soft and sticky material on the underside of the ears and extending below the plane defined by the bottom of the body center portion, and a sheet of impervious film over the underside of each body of soft and sticky material.

References Cited in the file of this patent

UNITED STATES PATENTS

| | | |
|---|---|---|
| 1,962,908 | Pierson | June 12, 1934 |
| 1,970,754 | Jonasen | Aug. 21, 1934 |
| 2,057,162 | Richey | Oct. 13, 1936 |
| 2,848,183 | Olson | Aug. 19, 1958 |